(12) United States Patent
Zou et al.

(10) Patent No.: US 12,261,494 B2
(45) Date of Patent: Mar. 25, 2025

(54) STATOR SEGMENT THERMAL BRIDGING SYSTEM FOR AN AXIAL FLUX MOTOR

(71) Applicant: GM Global Technology Operations LLC, Detroit, MI (US)

(72) Inventors: Yusheng Zou, Northville, MI (US); Jian Yao, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 17/987,352

(22) Filed: Nov. 15, 2022

(65) Prior Publication Data

US 2024/0136903 A1 Apr. 25, 2024
US 2024/0235352 A9 Jul. 11, 2024

(30) Foreign Application Priority Data

Oct. 25, 2022 (CN) .......................... 202211309924.0

(51) Int. Cl.
*H02K 21/24* (2006.01)
*H02K 1/14* (2006.01)
*H02K 1/2793* (2022.01)
*H02K 3/28* (2006.01)

(52) U.S. Cl.
CPC ............. *H02K 21/24* (2013.01); *H02K 1/146* (2013.01); *H02K 1/2793* (2013.01); *H02K 3/28* (2013.01)

(58) Field of Classification Search
CPC .......... H02K 21/24; H02K 1/14; H02K 1/146; H02K 1/2793; H02K 3/28; H02K 1/182; H02K 9/22; H02K 9/223; H02K 1/20; H02K 3/46
See application file for complete search history.

(56) References Cited

U.S. PATENT DOCUMENTS

2010/0071972 A1* 3/2010 Lamperth ............ B60K 7/0007
180/65.21
2013/0342054 A1* 12/2013 Long ...................... H02K 11/25
310/71
2022/0302789 A1* 9/2022 Jensen ...................... H02K 5/04

FOREIGN PATENT DOCUMENTS

DE 102016203140 A1 * 8/2017

OTHER PUBLICATIONS

English translation of DE-102016203140-A1 (Year: 2017).*

* cited by examiner

*Primary Examiner* — Tulsidas C Patel
*Assistant Examiner* — Joshua Kiel M Rodriguez
(74) *Attorney, Agent, or Firm* — CANTOR COLBURN LLP

(57) ABSTRACT

An axial flux electric motor includes a stator including a stator segment having a support frame formed with an opening defined by a continuous edge. A stator winding segment is arranged in the opening of the stator segment. The stator winding segment has an outer surface. A thermal interface material (TIM) is disposed between the outer surface of the stator winding segment and the continuous edge defining the opening in the support frame.

20 Claims, 4 Drawing Sheets

STATOR SEGMENT THERMAL BRIDGING SYSTEM FOR AN AXIAL FLUX MOTOR

CROSS-REFERENCE TO RELATED APPLICATIONS

This application claims priority to Chinese Patent Application No. 202211309924.0, filed Oct. 25, 2022, the contents of which are incorporated by reference herein in their entirety.

INTRODUCTION

The subject disclosure relates to the art of electric machines and, more particularly, to a thermal bridging system for a stator segment of an axial flux electric motor.

Electric machines typically include a stator that is supported at an internal surface of a housing and a rotor that is positioned adjacent the stator. The stator includes stator windings that are energized to produce a magnetic field. The magnetic field causes the rotor to spin and produce power. During operation, the stator and rotor produce heat. Various systems are employed to reduce heat produced by an electric machine including passing an airflow through the housing or incorporating coolant jackets into the housing.

In certain electric machines, such as axial flux machines, gaps exist between stator windings and stator core segments. The gaps reduce thermal transfer efficiency between the stator windings and the stator core. Further, the thermal transfer is focused on areas adjacent to the gaps. Focusing thermal transfer on areas adjacent to the gaps creates thermal excursions or areas having a higher temperature than surrounding areas. As such, heat transfer between the stator core and the housing may be reduced. Accordingly, it would be desirable to create a thermal flow path across gaps that may exist in a stator.

SUMMARY

An axial flux electric motor, in accordance with a non-limiting example, includes a stator including a stator segment having a support frame formed with an opening defined by a continuous edge. A stator winding segment is arranged in the opening of the stator segment. The stator winding segment has an outer surface. A thermal interface material (TIM) is disposed between the outer surface of the stator winding segment and the continuous edge defining the opening in the support frame.

In addition to one or more of the features described herein the support frame includes a first axial surface and a second axial surface that is opposite the first axial surface, the TIM being disposed on the first axial surface.

In addition to one or more of the features described herein the support frame includes a first axial surface and a second axial surface that is opposite the first axial surface, the TIM being disposed at one of the first axial surface and the second axial surface.

In addition to one or more of the features described herein the TIM extends between the first axial surface and the second axial surface between the outer surface of the stator winding segment and the continuous edge defining the opening in the support frame.

In addition to one or more of the features described herein the outer surface of the stator winding segment is spaced from the continuous edge defining the opening in the support frame by a gap, the TIM bridging the gap.

In addition to one or more of the features described herein the TIM is a solid material arranged between the outer surface of the stator winding segment and the continuous edge defining the opening in the support frame.

In addition to one or more of the features described herein the TIM is a hardened fluid arranged between the outer surface of the stator winding segment and the continuous edge defining the opening in the stator support.

In addition to one or more of the features described herein the TIM extends entirely about the opening between the outer surface of the stator winding segment and the continuous edge.

In addition to one or more of the features described herein the stator includes a plurality of stator supports arranged in an annular array.

In addition to one or more of the features described herein the axial flux electric motor includes a housing having an inner surface and additional TIM arranged between the radially outer surface of the support frame and the inner surface of the housing.

A vehicle, in accordance with a non-limiting example, includes a body defining a passenger compartment and an electric motor supported in the body. The electric motor includes a housing having an outer surface and an inner surface. A stator including a stator segment having a support frame including a radially outer surface is fixedly connected relative to the inner surface of the housing. The support frame is formed with an opening defined by a continuous edge. A stator winding segment is arranged in the opening of the stator segment. The stator winding segment has an outer surface section. A thermal interface material (TIM) is disposed between the outer surface of the stator winding segment and the continuous edge defining the opening in the support frame.

In addition to one or more of the features described herein the support frame includes a first axial surface and a second axial surface that is opposite the first axial surface, the TIM being disposed on the first axial surface.

In addition to one or more of the features described herein the support frame includes a first axial surface and a second axial surface that is opposite the first axial surface, the TIM being disposed at one of the first axial surface and the second axial surface.

In addition to one or more of the features described herein the TIM extends between the first axial surface and the second axial surface between the outer surface of the stator winding segment and the continuous edge defining the opening in the support frame.

In addition to one or more of the features described herein the outer surface of the stator winding segment is spaced from the continuous edge defining the opening in the stator support frame by a gap, the TIM bridging the gap.

In addition to one or more of the features described herein the TIM is a solid material arranged between the outer surface of the stator winding segment and the continuous edge defining the opening in the support frame.

In addition to one or more of the features described herein the TIM is a hardened fluid arranged between the outer surface of the stator winding segment and the continuous edge defining the opening in the support frame.

In addition to one or more of the features described herein the TIM extends entirely about the opening between the outer surface of the stator winding segment and the continuous edge.

In addition to one or more of the features described herein the stator includes a plurality of stator supports arranged in an annular array.

In addition to one or more of the features described herein additional TIM is arranged between the radially outer surface of the support frame and the inner surface of the housing.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
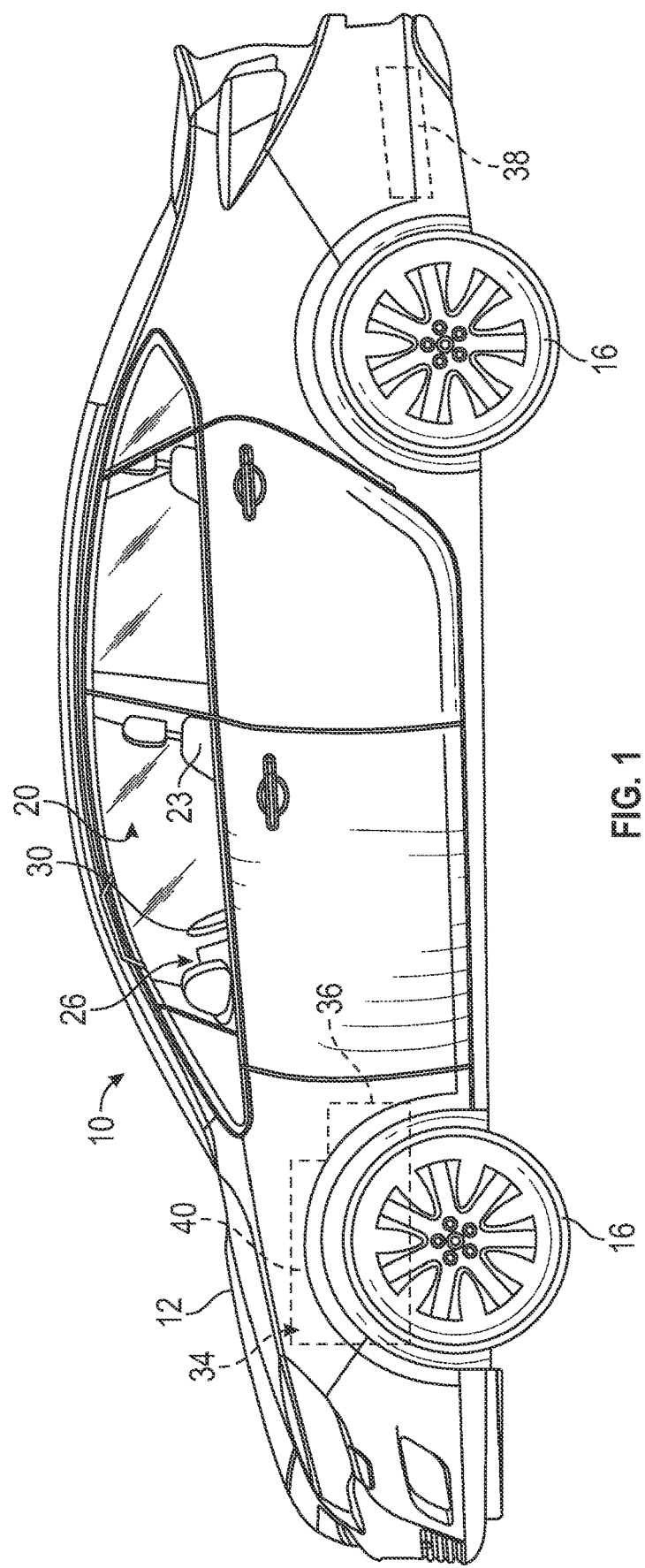
FIG. 1 is a left side elevational view of a vehicle including an electric motor having a stator including a stator segment thermal bridging system, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. Two of the plurality of wheels 16 are steerable. That is, changing a position of two of the plurality of wheels 16 relative to body 12 will cause vehicle 10 to change direction. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s). Vehicle 10 includes an electric motor 34 connected to a transmission 36 that provides power to one or more of the plurality of wheels 16. A rechargeable energy storage device (RESS) 38 provides power to electric motor 34.

Figure 2:
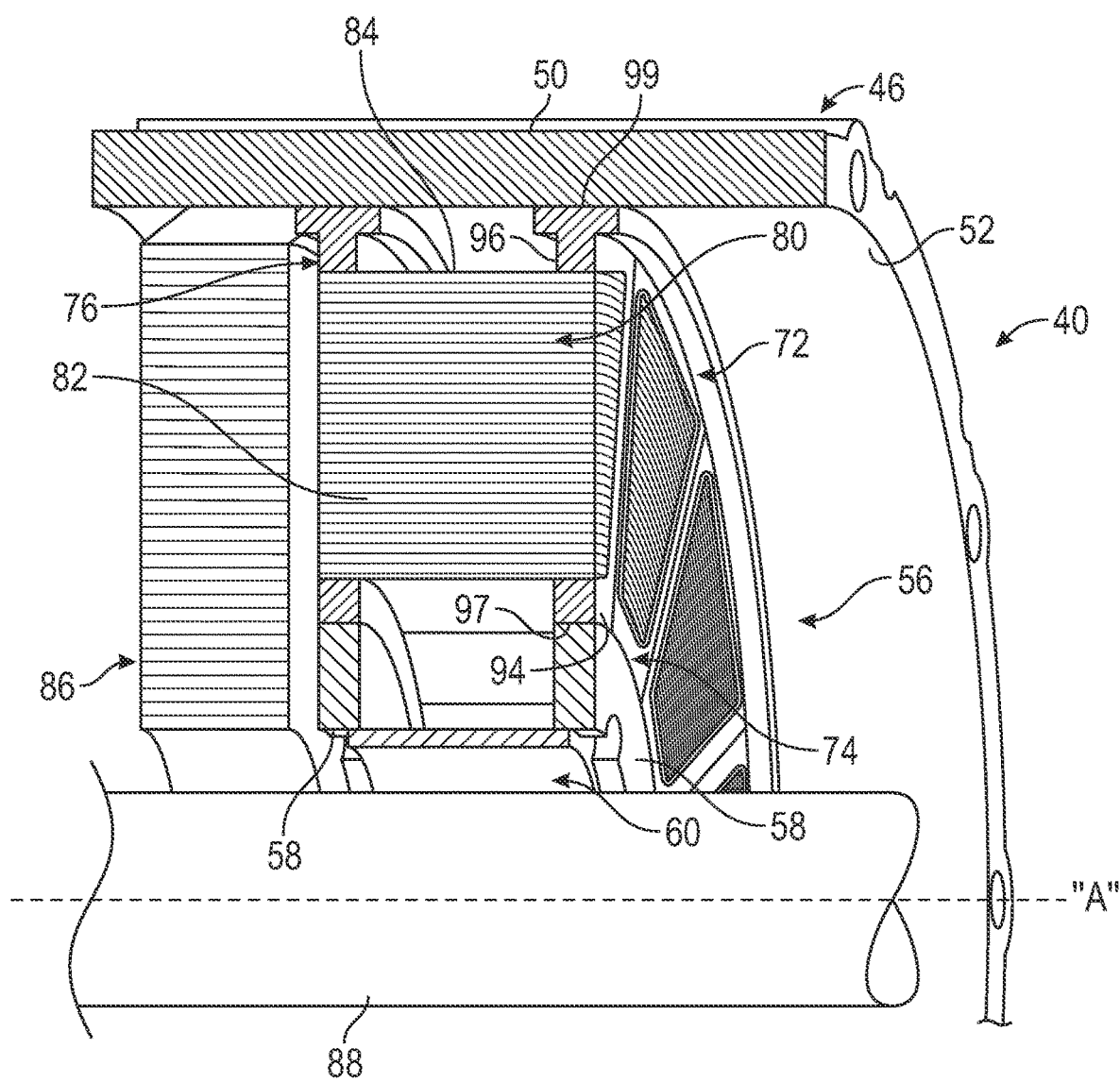
FIG. 2 is a partial cross-sectional perspective view of the electric motor of FIG. 1 including the stator having the stator segment thermal bridging system, in accordance with a non-limiting example.
Figure 3:
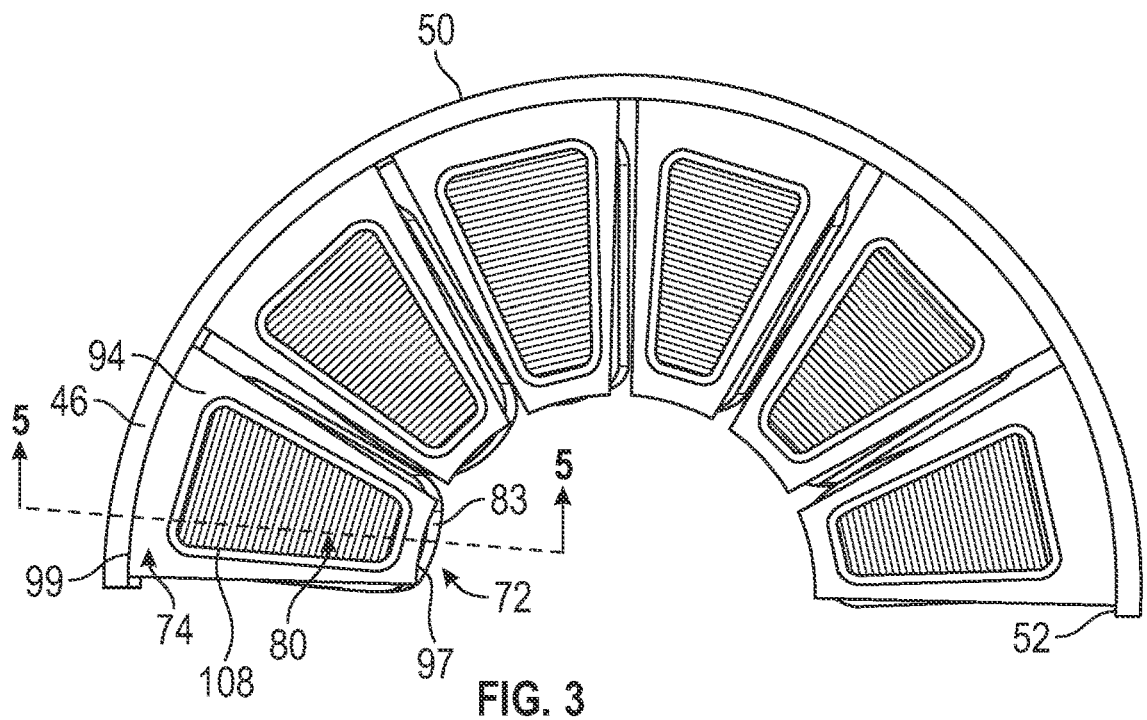
FIG. 3 is a partial elevational view of the stator including a stator segment thermal bridging system, in accordance with a non-limiting example.
Figure 4:
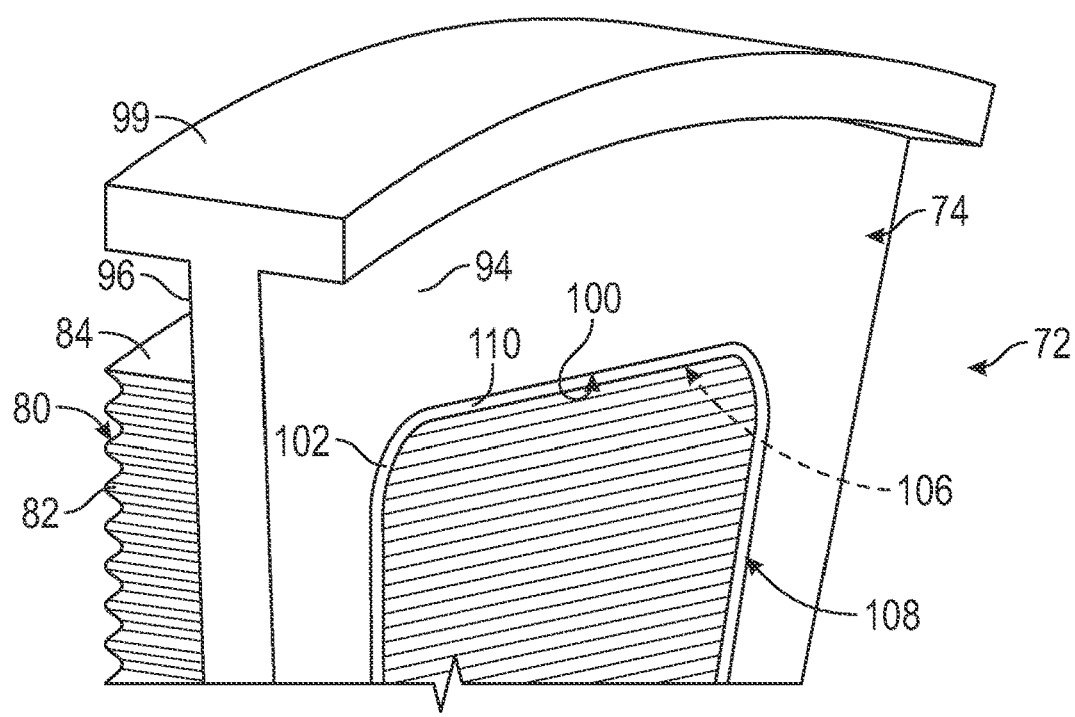
FIG. 4 is a partial perspective view of a stator segment of the stator of FIG. 2, in accordance with a non-limiting example.

In a non-limiting example, electric motor 34 takes the form of an axial flux electric motor 40 having a housing 46 as shown in FIG. 2. Housing 46 includes an outer surface 50 and an inner surface 52. In a non-limiting example, a stator 56 is arranged within housing 46. Stator 56 includes an inner support member 58 that defines a passage 60. A plurality of stator segments, one of which is indicated at 72, is disposed between inner support member 58 and inner surface 52. As shown in FIGS. 3 and 4, each stator segment 72 includes a first support frame 74 and a second support frame 76. As will be detailed herein, a stator winding segment 80 is supported between first support frame 74 and second support frame 76. Stator winding segment 80 is formed from a plurality of laminations 82 that are wound by a copper conductor 83 (FIG. 3). Stator winding segment 80 includes an outer surface section 84. A rotor 86 is axially spaced from second support frame 76. Rotor 86 is supported on a shaft 88 that passes through passage 60 and connects with transmission 36.

Figure 5:
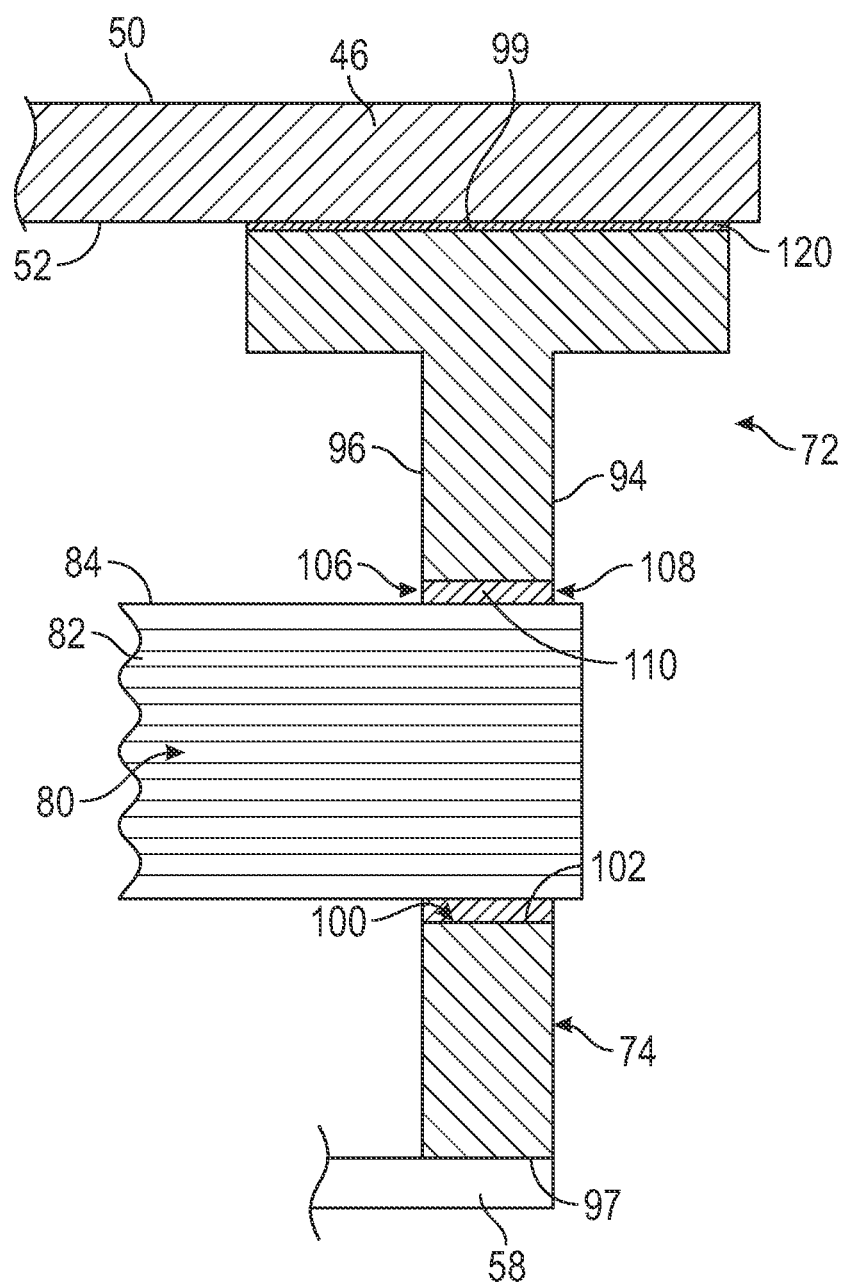
FIG. 5 is a cross-sectional side view of a stator segment taken through the line 5-5 of the stator of FIG. 3, in accordance with a non-limiting example.

Reference will now follow to FIGS. 3-5 and with continued reference to FIG. 2 in describing first support frame 74 with an understanding that second support frame 76 includes corresponding structure. First support frame 74 includes a first axial side 94 and a second axial side 96. Second axial side 96 is opposite first axial side 94. First support frame 74 also includes a radially inner surface 97 that is joined with inner support member 58 and a radially outer surface 99. First support frame 74 is provided with an opening 100 having a continuous edge 102. Opening 100 extends through first axial side 94 and second axial side 96. Opening 100 supports a first end (not separately labeled) of stator winding segment 80. A second end (also not separately labeled) of stator winding segment 80 is supported by second support frame 76.

A gap 106 exists between outer surface section 84 of stator winding segment 80 and continuous edge 102 defining opening 100. Gap 106 may be continuous, or include a series of non-contiguous sections. Gap 106 reduces thermal transfer efficiency between stator winding segment 80 and first support frame 74. As such, gap 106 could lead to thermal excursions (i.e., areas of stator winding segment having a higher temperature than surrounding portions) on stator winding segment 80 that may reduce operational efficiency. In an effort to reduce thermal excursion, first support frame 74, in accordance with a non-limiting example, includes a thermal bridging system 108 that takes the form of thermal interface material (TIM) 110 extending across gap 106 connecting stator winding segment 80 and first support frame 74. Additional TIM (not shown) may be provided between stator winding segment 80 and second support frame 76.

In a non-limiting example, TIM 110 is arranged on first axial side 94 bridging stator winding segment 80 and first support frame 74. In another non-limiting example, TIM 110 is arranged on second axial side 96 bridging stator winding segment 80 and first support frame 74. In still a further non-limiting example, TIM 110 extends between stator winding segment 80 and first support frame 74 from first axial side 94 to second axial side 96. In a non-limiting example, TIM 110 may take the form of a solid material such as a sheet. In another non-limiting example, TIM 110 may take the form of a fluid that hardens after a prescribed period or when exposed to an accelerant. Regardless of the form, TIM 110 forms a bridge that transports heat uniformly from each stator winding segment radially outwardly through each stator segment. Additional TIM 120 may be arranged between radially outer surface 99 of first support frame 74 and inner surface 52 of housing 46.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An axial flux electric motor comprising:
a stator including a stator segment having a support frame formed with a plurality of openings, each opening in the plurality of openings being defined by a corresponding continuous edge, and wherein each continuous edge defines a closed space;
a stator winding segment arranged in the opening of the stator segment, the stator winding segment having an outer surface;
a thermal interface material (TIM) disposed between the outer surface of the stator winding segment and the continuous edge defining the opening in the support frame; and
further comprising a housing having an inner surface and additional TIM arranged between an outer surface of the support frame and the inner surface of the housing, and wherein the outer surface of the support frame has a larger axial length than an axial length of the continuous edge.

2. The axial flux electric motor according to claim 1, wherein the support frame includes a first axial surface and a second axial surface that is opposite the first axial surface, the TIM being disposed on the first axial surface.

3. The axial flux electric motor according to claim 2, wherein the TIM extends between the first axial surface and the second axial surface between the outer surface of the stator winding segment and the continuous edge defining the opening in the support frame.

4. The axial flux electric motor according to claim 1, wherein the support frame includes a first axial surface and a second axial surface that is opposite the first axial surface, the TIM being disposed at one of the first axial surface and the second axial surface.

5. The axial flux electric motor according to claim 1, wherein the outer surface of the stator winding segment is spaced from the continuous edge defining the opening in the support frame by a gap, the TIM bridging the gap.

6. The axial flux electric motor according to claim 1, wherein the TIM is a solid material arranged between the outer surface of the stator winding segment and the continuous edge defining the opening in the support frame.

7. The axial flux electric motor according to claim 1, wherein the TIM is a hardened fluid arranged between the outer surface of the stator winding segment and the continuous edge defining the opening in the stator support frame.

8. The axial flux electric motor according to claim 1, wherein the TIM extends entirely about the opening between the outer surface of the stator winding segment and the continuous edge.

9. The axial flux electric motor according to claim 1, wherein the stator includes a plurality of stator supports arranged in an annular array.

10. The axial flux electric motor of claim 1, wherein the outer surface of the support frame extends axially outward from the support frame in a first axial direction, and a second axial direction opposite the first axial direction.

11. A vehicle comprising:
a body defining a passenger compartment;
an electric motor supported in the body, the electric motor including
a housing having an outer surface and an inner surface;
a stator including a stator segment having a support frame including a radially outer surface fixedly connected relative to the inner surface of the housing, the support frame being formed with an opening defined by a continuous edge;
a stator winding segment arranged in the opening of the stator segment, the stator winding segment having an outer surface section; and
a thermal interface material (TIM) disposed between the outer surface of the stator winding segment and the continuous edge defining the opening in the support frame; and
further comprising a housing having an inner surface and additional TIM arranged between an outer surface of the support frame and the inner surface of the housing, and wherein the outer surface of the support frame has a larger axial length than an axial length of the continuous edge.

12. The vehicle according to claim 11, wherein the support frame includes a first axial surface and a second axial surface that is opposite the first axial surface, the TIM being disposed on the first axial surface.

13. The vehicle according to claim 11, wherein the support frame includes a first axial surface and a second axial surface that is opposite the first axial surface, the TIM being disposed at one of the first axial surface and the second axial surface.

14. The vehicle according to claim 13, wherein the TIM extends between the first axial surface and the second axial surface between the outer surface of the stator winding segment and the continuous edge defining the opening in the support frame.

15. The vehicle according to claim 11, wherein the outer surface of the stator winding segment is spaced from the continuous edge defining the opening in the stator support frame by a gap, the TIM bridging the gap.

16. The vehicle according to claim 11, wherein the TIM is a solid material arranged between the outer surface of the stator winding segment and the continuous edge defining the opening in the support frame.

17. The vehicle according to claim 11, wherein the TIM is a hardened fluid arranged between the outer surface of the stator winding segment and the continuous edge defining the opening in the support frame.

18. The vehicle according to claim 11, wherein the TIM extends entirely about the opening between the outer surface of the stator winding segment and the continuous edge.

19. The vehicle according to claim 11 wherein the stator includes a plurality of stator supports arranged in an annular array.

20. The vehicle according to claim 11, wherein the outer surface of the support frame extends axially outward from the support frame in a first axial direction, and a second axial direction opposite the first axial direction.

* * * * *